United States Patent [19]

Chen

[11] Patent Number: 5,435,549
[45] Date of Patent: Jul. 25, 1995

[54] GRIP FOR SPORTING EQUIPMENT

[76] Inventor: Dennis Chen, Suite 1, 11F, No. 95-8, Chang Ping Road, Sec 1, Taichung, Taiwan

[21] Appl. No.: 166,526

[22] Filed: Dec. 14, 1993

[51] Int. Cl.⁶ ............................................. A63B 49/00
[52] U.S. Cl. ................................ 273/75; 273/73 R; 273/81 R; 273/81.5
[58] Field of Search ............... 273/73 R, 75, 67 R, 273/81 R, 81 D, 81.2, 81.5; 74/551.9; 81/451

[56] References Cited

U.S. PATENT DOCUMENTS

| | | | |
|---|---|---|---|
| 4,015,851 | 4/1977 | Pennell | 273/75 |
| 4,053,676 | 10/1977 | Kaminstein | 273/75 X |
| 4,567,091 | 1/1986 | Spector | 273/75 X |
| 4,651,991 | 3/1987 | McDuff | 273/75 |
| 5,193,246 | 3/1993 | Huang | 273/75 X |

*Primary Examiner*—Raleigh W. Chiu

[57] ABSTRACT

A grip for sporting equipment comprises a first mat cloth strip, a foamed polyurethane strip and a second mat cloth strip sequentially adhered together in predetermined thickness. A resilient element of silicon elastoner is formed in the recesses inside the strips thereinbetween and a double faced tape is adhered on the top surface of the second mat cloth strip. So that the grip can be stuck and twined with the handle of the sporting equipments for providing shock absorbing effect thereon.

6 Claims, 4 Drawing Sheets

GRIP FOR SPORTING EQUIPMENT

BACKGROUND OF THE INVENTION

The present invention relates to overgrips, more particularly to such grip which are need for twining with a handle of game racket.

The handles of many equipments, bicycles, hand tools or sport rackets are made of wood, metal or plastic that they are too hard and uncomfortable for gripping. A conventional overgrip, as shown in FIG. 1, is used to twine about a handle to provide a protection layer. The conventional grip 10 is in strip form with two inclined sides 11, 12. It includes a foamed polyurethane strip layer 13 and a mat cloth strip layer 14 adhered to the foamed polyurethane strip layer 13.

Since the rider of bicycle and the holder of game racket, golf club or handtool have to firmly grip the handles during sporting, the thin layers of foamed polyurethane strip and mat cloth strip of the conventional grip are not soft enough to produce a cushioning effect for the great gripping force from the user's hands. Thus, the user's hands will be hurted or feeled uncomfortable by the hard wooded or metallic handle. Furthermore, the conventional grips cannot provide shock absorbing effect and are easy to fray at the edges.

SUMMARY OF THE PRESENT INVENTION

The main object of the present invention is to provide a more pliant and effective grip for sporting equipment, which can also provide softer cushioning effect for the holders.

Another object of the present invention is to provide a resilient grip for sporting equipment which can also provide shock absorbing effect and not easy to fray out.

Accordingly, the present invention provides a grip which comprises a first mat cloth strip layer, a foamed polyurethane strip layer, and a second mat cloth strip layer adhered between the first mat cloth strip layer and the foamed polyurethane strip layer. The two longitudinal sides of said gripping strip are in inclined forms respectively that the foamed polyurethane strip layer has a largest width. At least a recess member which extending substantially along the length of the grip is disposed centrally between the lateral edges of the first mat cloth strip layer. A layer of silicon elastomer with a thickness at least equal to the depth of the recess is applied to the recess to form an intermediate cushion body between the first and second mat cloth strip layer.

The present invention will be more fully understood by reference to the following detailed description thereof, when read in accompanying with the attached drawings.

DETAIL DESCRIPTION OF THE PREFERRED EMBODIMENT

Figure 1:
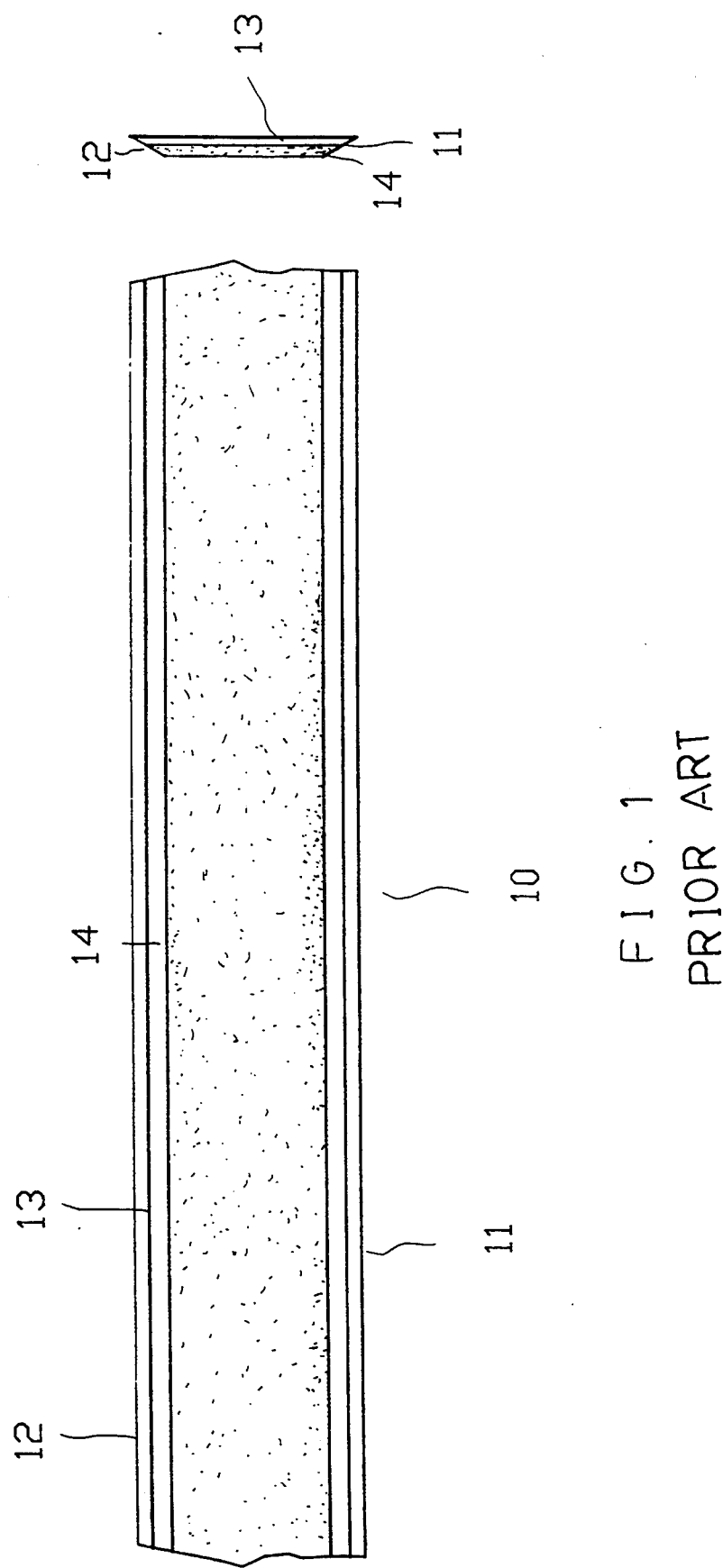
FIG. 1 is a sectional view of a prior art grip.
Figure 2:
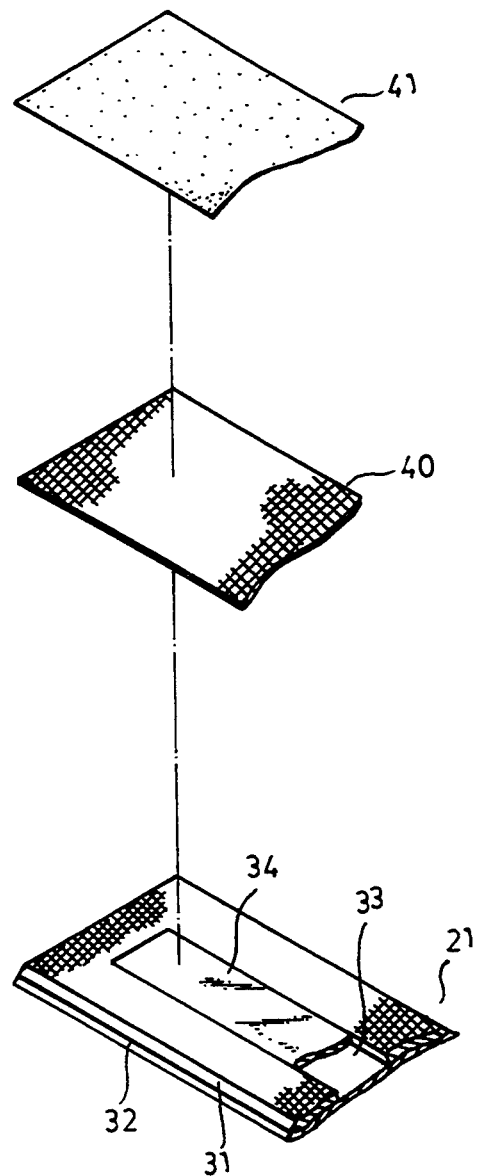
FIG. 2 is an exploded perspective view of a grip of a preferred embodiment according to the present invention.
Figure 3:
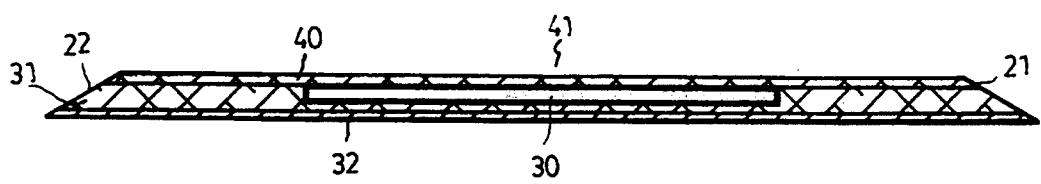
FIG. 3 is a sectional view of a grip of the above embodiment according to the present invention.

A typical embodiment of a grip for sporting equipment of the present invention is illustrated in FIG. 2 and FIG. 3. The grip comprises a first mat cloth strip 31, a foamed polyurethane strip 32, and a second mat cloth strip 40. The thickness of the first mat cloth strip 31 is 1.2 mm approximately, the foamed polyurethane strip 32 is 0.3 mm to 0.5 mm approximately, and the second mat cloth strip 40 is 0.5 mm approximately. An elongate recess 33 which extends substantially along the length of a first side of the first mat cloth strip 31 is disposed centrally between the lateral edges thereof. The depth of the recess 33 is approximately 1 mm. The foamed polyurethane strip 32 is attached to the second side of the first mat cloth strip 31. A resilient element 34, conforming in shape and dimension with the recess 33, is a layer of silicon elastomer, ie. The A-type commonly use in caulking compound. The resilient element 34 is applied to the corresponding recess 33 so as to form a film or elastomer 30 upon curing. The thickness of the resilient element 34 should substantially equal to the depth of the recess 33.

The second mat cloth strip 40, approximately 0.5 mm in thickness, is adhered to the first side of the first mat cloth strip 31. As shown in FIG. 3, the two longitudinal edges of the grip are cut to form two inclined sides 21 and 22 inwardly from the foamed polyurethane strip 32 respectively. A adhesive member, such as a double faced tape 41 having two adhesive sides, as shown in FIG. 2 and FIG. 3, is adhered to the second mat cloth strip 40 by one of its adhesive sides. Thus, the grip can stick and twin with a handle (not shown) by means of the other adhesive side of the tape 41.

Figure 4:
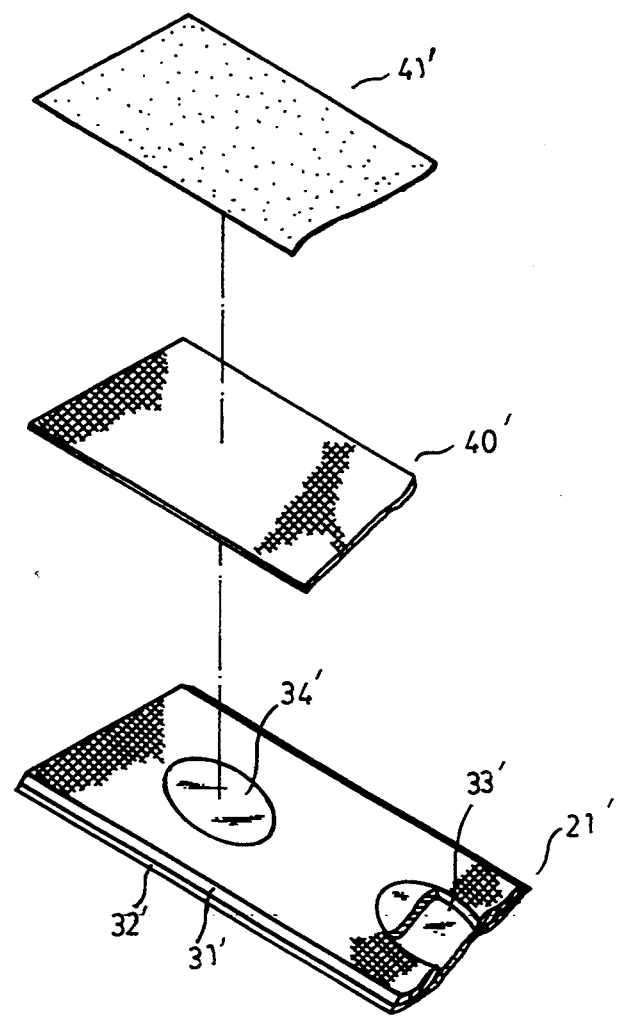
FIG. 4 is an exploded perspective view of a grip of an alterative embodiment according to the present invention.

An alterative embodiment of a grip for sporting equipment of the present invention is illustrated in FIG. 4. The grip also comprises a first mat cloth strip 31', a foamed polyurethane strip 32', a second mat cloth strip 40', and a double faced tape 41' that all attach together as recited in the previous embodiment. In which, a plurality of circular recesses 33' are formed at spaced position along the length of the first mat cloth strip 31'. More than one resilient element 34' are made of silicon elastomer, such as the A-type commonly use in caulking compound. Each the resilient element 34' is disposed in the corresponding recess 33' which has conformed in, shape and dimension with the resilient element 34'. The grip is also stuck and twined with a handle by means of the double faced tape 41.

According to the improved structure of the aforesaid embodiments of the present invention, a more pliant and effective grip for sporting equipment is obtained. Since the grip of the present invention provides two layers of mat cloth strips and at least a layer of silicon elastomer therebetween which can provide good resilient effect. The grip of a sporting equipment, such as tennis racket, can absorb portion of the shock and provide softer cushioning effect for the holder. Besides, the presentation of the resilient element within the grip can also prevent the grip to be fraied out easily.

I claim:

1. A grip for sporting equipment, comprising:
    a first mat cloth strip having an elongated recess which extends substantially along the length of a first side of said first mat cloth strip, being disposed centrally between the lateral edges thereof;

a foamed polyurethane strip attached to the second side of said first mat cloth strip;

a resilient element, conforming in shape and dimension with said recess, disposed within said corresponding recess so as to form an elastomer therein upon curing;

a second mat cloth strip, adhered to the first side of said first mat cloth strip, and a double face adhesive member attached to the exposed side of said second mat cloth strip providing an adhesive surface for attaching said grip to a handle;

the two longitudinal edges of said grip are cut to form two inclined sides inwardly from said foamed polyurethane strip respectively.

2. A grip for sporting equipment, comprising a first mat cloth strip, having a plurality of recesses which are formed at spaced positions along the length of a first side of said first mat cloth strip;

a foamed polyurethane strip attached to the second side of said first mat cloth strip;

a plurality of resilient elements; each of said resilient elements disposed with a corresponding recess which has conformed in shape and dimension with said resilient element;

a second mat cloth strip, adhered to the first side of said first mat cloth strip, and a double faced adhesive member attached to the exposed side of said second mat cloth strip providing an adhesive surface for attaching said grip to a handle;

the two longitudinal edges of said grip are cut to form two inclined sides inwardly from said foamed polyurethane strip respectively.

3. The grip as recited in claim 1 or 2, wherein said resilient element is a silicon elastomer, 4. The grip as recited in claim 1 or 2, wherein said double faced adhesive member tape.

5. The grip as recited in claim 1 or 2, wherein the thickness of said first mat cloth strip is 1.2 mm; the thickness of said foamed polyurethane strip is 0.3 to 0.5 mm and the thickness of said second mat cloth strip is 0.5 mm and the depth of said recess is 1 mm.

6. The grip as recited in claim 1 or 2, wherein the thickness of said resilient element is 1 mm.

* * * * *